(12) United States Patent
Best

(10) Patent No.: US 8,021,029 B2
(45) Date of Patent: Sep. 20, 2011

(54) LED EMERGENCY LIGHT SAFETY APPARATUS FOR A VEHICLE

(76) Inventor: Theodore Best, Haverstraw, NY (US)

( * ) Notice: Subject to any disclaimer, the term of this patent is extended or adjusted under 35 U.S.C. 154(b) by 120 days.

(21) Appl. No.: 12/234,302

(22) Filed: Sep. 19, 2008

(65) Prior Publication Data

US 2010/0073947 A1 Mar. 25, 2010

(51) Int. Cl.
*F21V 21/00* (2006.01)
*B60Q 1/26* (2006.01)
(52) U.S. Cl. ........ 362/486; 362/398; 362/397; 362/545; 362/249.02
(58) Field of Classification Search .................. 362/486, 362/545, 249.02–249.06, 398, 397, 549, 362/249.07–249.11
See application file for complete search history.

(56) References Cited

U.S. PATENT DOCUMENTS

| 1,856,519 | A | * | 5/1932 | Spears | 40/564 |
| 1,932,143 | A | * | 10/1933 | Piercy | 362/398 |
| 4,173,035 | A | * | 10/1979 | Hoyt | 362/249.04 |
| 5,303,132 | A | * | 4/1994 | Lowder | 362/138 |
| 6,027,227 | A | * | 2/2000 | Tung | 362/241 |
| 6,299,337 | B1 | * | 10/2001 | Bachl et al. | 362/545 |
| 6,504,487 | B1 | * | 1/2003 | Pederson | 340/815.45 |
| 2003/0016543 | A1 | * | 1/2003 | Akiyama | 362/499 |
| 2010/0103662 | A1 | * | 4/2010 | Varrin | 362/231 |

* cited by examiner

*Primary Examiner* — Bao Q Truong
(74) *Attorney, Agent, or Firm* — Leason Ellis LLP

(57) ABSTRACT

According to one embodiment, an LED emergency light apparatus for use with a motorized vehicle includes a foldable substrate that is formed of a plastic material and a plurality of light emitting diodes arranged about and coupled to the substrate such at a portion thereof protrudes beyond one face of the substrate. The apparatus also includes a controller in electric communication with the light emitting diodes and a power source. In addition, means for releasably attaching the substrate to a support surface is also provided.

9 Claims, 6 Drawing Sheets

LED EMERGENCY LIGHT SAFETY APPARATUS FOR A VEHICLE

TECHNICAL FIELD

The present invention relates to vehicles and in particular, to safety equipment in the form of emergency lighting for a vehicle.

BACKGROUND

One of the most dreadful, fearful events for a motorist is when the vehicle the motorist is riding in has mechanical or other type of failure and is inoperative, thereby leaving the occupants of the vehicle stranded. This is particularly problematic when the breakdown occurs on a dark, desolate stretch of road or where the breakdown occurs in a very busy, congested stretch of the road where driving conditions are difficult.

One related problem is that if the breakdown occurs at night or on a sharp bend or just over a rise in the road, it can be very dangerous for the occupants since the vehicle may be very difficult to see. Also, in some unfortunate instances, the vehicle is not able to be completely moved out of the travel lane of the road and therefore, a portion of the vehicle lies within the travel lane, thereby creating a very dangerous situation. This can potentially lead to another car striking the vehicle and injuring, even fatally, the occupants of the vehicle.

There are a number of products available to both alert other motorists that an emergency exists and that help should be summoned and to make sure other motorists clearly see the broken down vehicle. These products range from a simple bright orange flag that has a message printed thereon, to a safety flare that is placed in the road before the vehicle, to a portable strobe light to alert other motorists and also to a number of emergency flashing light units.

While several multiple LED emergency flashing light units are available for use with a vehicle, they suffer from a number of disadvantages. For example, one LED product is a rigid unit that includes a number of LEDs and can be mounted in a stand in both vertical and horizontal orientations. The unit can be coupled to a vehicle using several different techniques, including magnets or it can be inserted into the stand. However, one disadvantage of this product is that the unit is a rigid unit (e.g., a block) and therefore, it is not that flexible and this limits the locations of where the product can be used. In addition, the rigid nature of the unit limits the manner in which it can be stored. For example, if it is desired for the unit to have a large elongated appearance, a comparable space must be found for storing the unit and also, the maneuverability of the unit within the cabin of the vehicle may be difficult.

SUMMARY

According to one embodiment, an LED emergency light apparatus for use with a motorized vehicle includes a foldable substrate that is formed of a plastic material and a plurality of light emitting diodes arranged about and coupled to the substrate such at a portion thereof protrudes beyond one face of the substrate. The apparatus also includes a controller in electric communication with the light emitting diodes and a power source. In addition, means for releasably attaching the substrate to a support surface is also provided.

These and other aspects, features and advantages shall be apparent from the accompanying Drawings and description of certain embodiments of the invention.

DETAILED DESCRIPTION OF CERTAIN EMBODIMENTS OF THE INVENTION

Figure 1A:
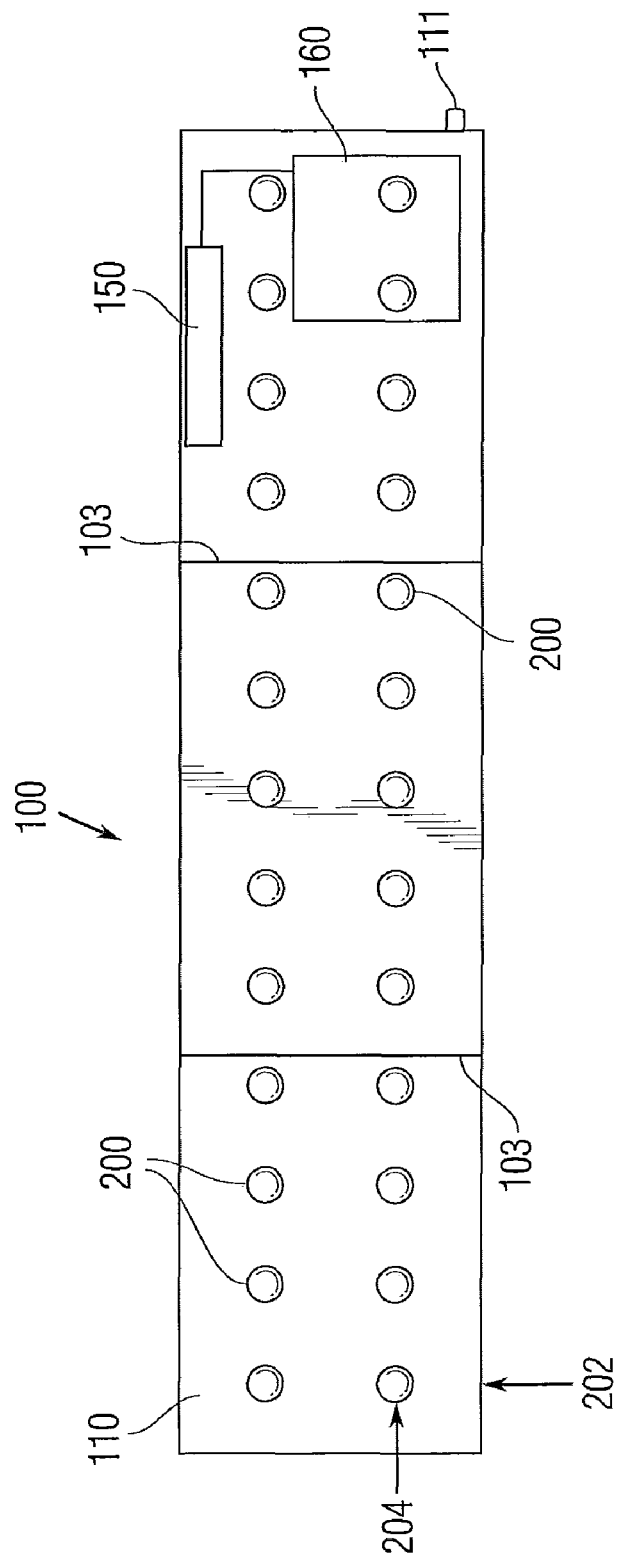
FIG. 1 is an elevation view of an LED emergency light safety apparatus according to a first embodiment.
FIG. 1B is a perspective view of an LED emergency light safety apparatus according to a second embodiment.
FIG. 1C is an LED emergency light safety apparatus according to a third embodiment.

In a first embodiment of the present invention, an emergency light safety apparatus 100 is illustrated in FIG. 1A. The apparatus 100 is in the form of a substrate 110 that has a predetermined shape and size. For example, the apparatus 100 can have a rectangular shape; however, other shapes are equally possible, such as square, etc. The apparatus 100 is preferably weatherproof.

In one embodiment, the substrate 110 is formed of a flexible material to allow the safety apparatus 100 to be freely bendable, thereby increasing the number of locations where the apparatus 100 can be used and also increasing the ease of storage. For example, the substrate 110 can be formed of a flexible plastic material, such as a polymeric film material or the like, that is capable of being bended and folded. The substrate 110 can be formed of two films that are bonded together in select locations, such as along the peripheral edges of the films, thereby defining an interior pocket or space that can receive different components, such as the light sources described below. The films can come in any number of different colors and can be transparent, semi-transparent or opaque. Alternatively, the substrate 110 can be more of a rigid structure, such as a bar or rail.

To assist the user in folding the emergency light apparatus 100, the substrate 110 can have a number of score or fold lines 103 that define areas in which the substrate 110 is folded and to assist the user in folding the apparatus 100 for storage thereof, etc.

Figure 1B:
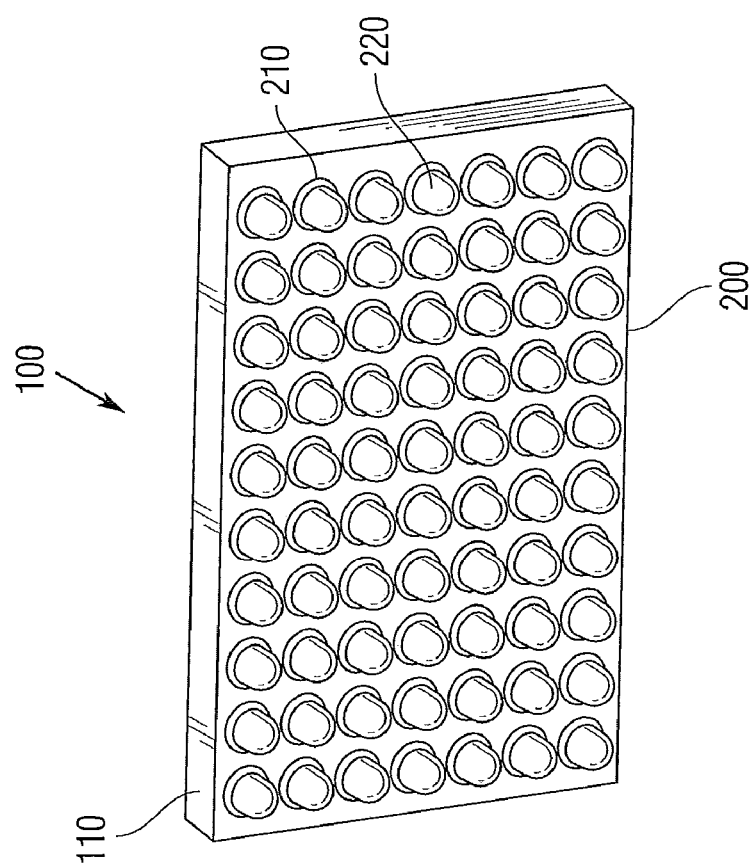

The substrate 110 has a plurality of light sources 200 that are in the form of light emitting diodes (LED's) that are arranged according to a predetermined pattern. For example, the LEDs 200 can be arranged in columns 202 and rows 204. As shown in FIG. 1B, each of the LEDs 200 can have a shoulder portion 210 adjacent the LED support, which is in the form of the substrate 110, and a dome 220. The LEDs 200 are situated to be in electric communication with controller and a power supply 160, such as one or more batteries (e.g., a 9V battery). The use of light emitting diodes (LEDs) instead of the traditional halogen or gaseous discharge xenon lamps results in a reduction of heat generation, current draw, and electromagnetic emissions, while increasing lamp life and producing a more true output light color. Alternatively, the power source can be as 12V DC power source that is accessed through a cigarette lighter of the vehicle in which case a power cord is attached at one end to the cigarette lighter and at the other end to a contact (connector or adapter 111) that is part of the substrate 110. Preferably, the apparatus 100 includes both an adapter to permit connection to a 12V power source and a battery compartment in case the vehicle's battery has no insufficient or no power.

Figure 1C:
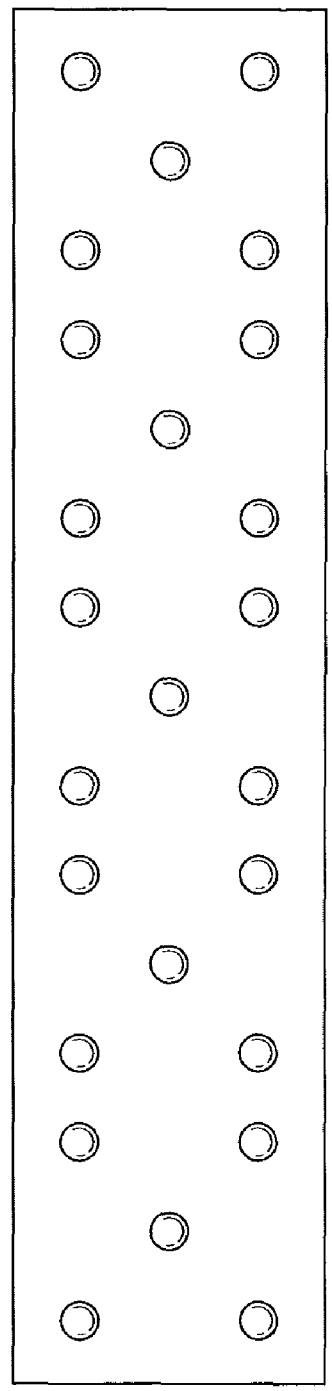

In the embodiment shown in FIG. 1A, the LEDs 200 are arranged according to two rows 204 that extend the length of the substrate 110. FIG. 11B shows another embodiment where there are more than two columns and rows of LEDs 200. It will be appreciated that the LEDs 200 can be arranged in any number of different arrangements including arranging the LEDs 200 so that they define a repeating pattern of Xs that extend the length of the substrate 110. This arrangement is shown in FIG. 1C. In addition, the LEDs can be arranged to display a reverse character message, such as "HELP."

The controller 150 is used to selectively activate columns 202, rows 204, or individual LEDs 200 to create any number of different light signals that can be selected by the user. For example, the LEDs 200 can be used to create a constant light signal, a strobe light signal, a flashing light signal, the illusion of a rotating or an oscillating light signal, a reverse character message, or images such as arrows. The controller 150 is generally in the form of a microprocessor and circuitry and is preferably contained within, attached to, or an element of, the LED support (substrate 110). It will be appreciated that the controller 150 can be programmed by an external controller and powered through a cable that is attached thereto or the controller 150 can be preprogrammed. The circuitry is capable of producing a revolving, oscillating or flashing light signal. For example, when one program can be one in which a moving arrow is displayed by first displaying one end segment of the arrow and then displaying one or more other segments till the last segment displayed is the pointed end of the arrow.

Figure 2:
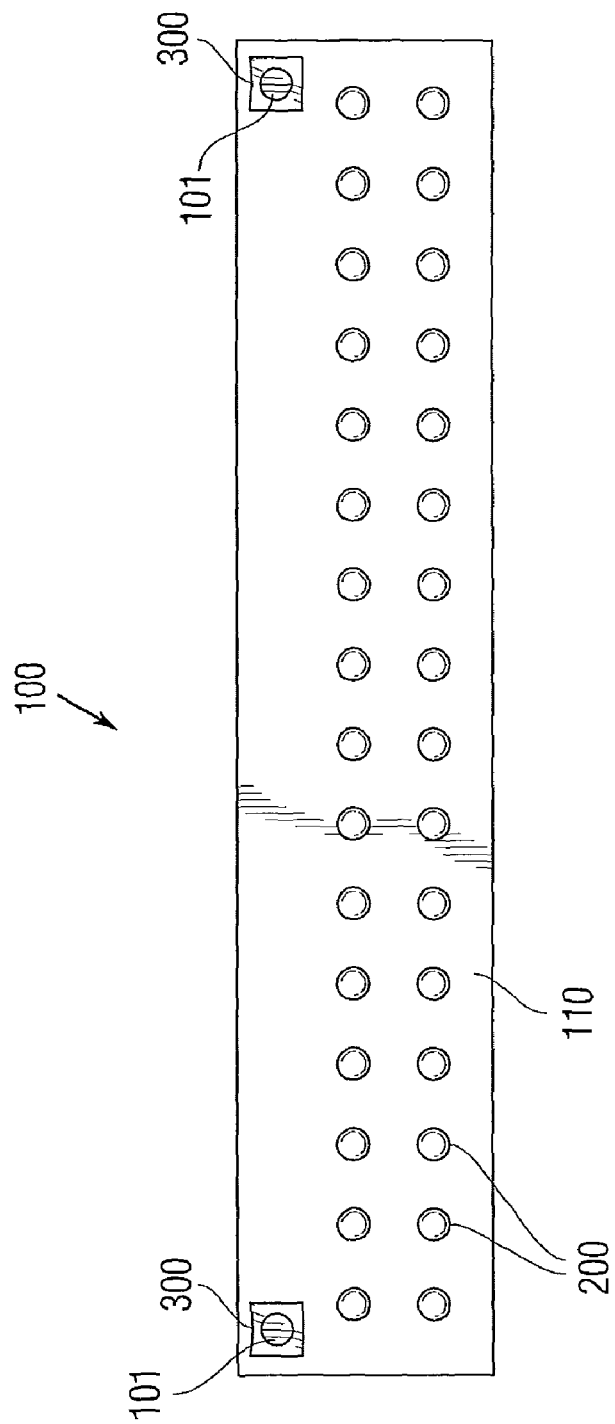
FIG. 2 is an LED emergency light safety apparatus according to a fourth embodiment.

The apparatus 100 can be coupled to the vehicle using any number of different means, including but not limited to, the using suction cups, hook and loop fabric, and/or any other releasable affixation mechanism. In some situations it is desirable or necessary for the substrate 110 to be hung on the vehicle body itself as opposed to on the windshields (e.g., the vehicle breaks down at an angle where the orientation of the windshield is not advantageous to alert other motorists of the emergency). In this situation, the substrate 110 can be attached to a metal body panel by using magnets 101. The magnets 101 can be permanently attached to the substrate (e.g., in corners thereof) or the magnets can be removably contained in pockets that are integrally formed in the substrate 110. For example as shown in FIG. 2, open slotted pockets 300 can be formed along one face of the substrate 110 to allow magnets 101 to be inserted therein for attaching the substrate 110 to the metal body panel. The magnets 101 can be left in the pockets 300 even when the substrate 110 is not attached to the metal body panel or the magnets can be removed and only placed in the pockets 300 when the substrate 110 needs to be attached to the metal body panel.

Figure 3:
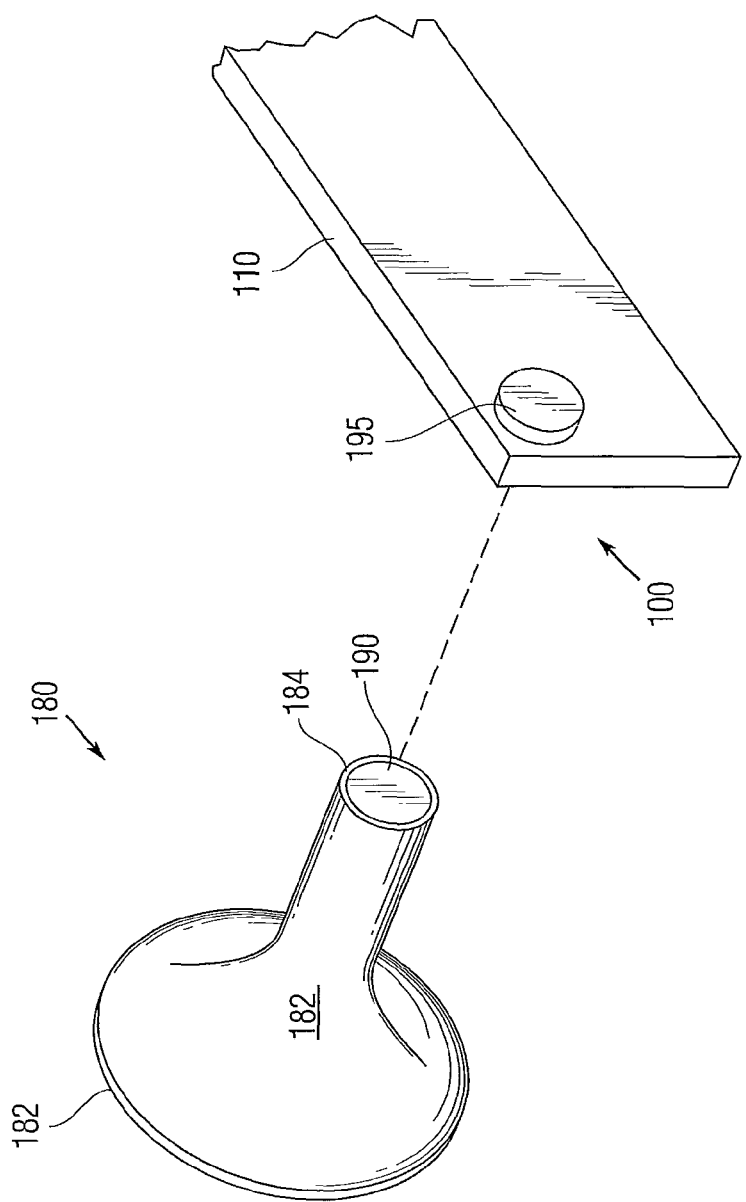
FIG. 3 is a perspective view of a portion of the LED emergency light safety apparatus combined with a suction cup coupling member.

In one embodiment shown in FIG. 3, the substrate 110 can engage suction cups 180 for securely hanging the apparatus 100 in a desired location, such as along the inside or the rear windshield or the inside of the front windshield. The suction cups 180 are designed so that they are not permanently attached to the substrate 100 but rather the suction cup 180 includes a cup portion 182 and a stem portion 184 that extends from the cup portion 182. The stem portion 184 is an elongated stem that has a free end 186 opposite the cup portion 182. At the free end 186, a first magnet 190 is disposed and is preferably, permanently attached to the free end 186. For example, the first magnet 190 can be laid within a recessed channel. The first magnet 190 has one polarity that is opposite the polarity of a second magnet 195 that is associated with the substrate 110. For example and as described herein, the second magnet 195 can be permanently attached to the substrate 110 as by a bonding process or the second magnet 195 can be removably contained within a pocket that is part of the substrate 110. In either event, the substrate 110 is securely coupled to the suction cups 180 by bringing the second magnets 195 into close proximity or in a touching relationship with the first magnets 190. This results in the substrate 110 being securely coupled to the suction cups 180 and allows the substrate 110 to be hung in any number of different locations.

For example, the suction cups 180 can be user for more than the apparatus 100 and they can be part of a kit that includes a number of accessories. This allows the same suction cups 180 that are used to retain and hold the substrate 110 to also be used to retain other accessories, such as a sunscreen that includes second magnets 195 in at least two corners thereof or at other locations thereof. The suction cups 180 can thus be placed in desired positions, such as along the top of the rear windshield. Depending upon the needs of the motorist, the section cups 180 can be used to hang any number of different accessories, including a sunshield or the emergency light apparatus 100, as well as theme oriented banners, such as a logo of a sports team, that can be displayed during different occasions, such as tailgating at a game, etc. In the event that an emergency arises and the use of the apparatus 100 is desired, the user simply removes any accessory that is hanging from the suction cups 180, retrieves the substrate 110 and then attaches the substrate 110 to the suction cups 180.

Figure 4:
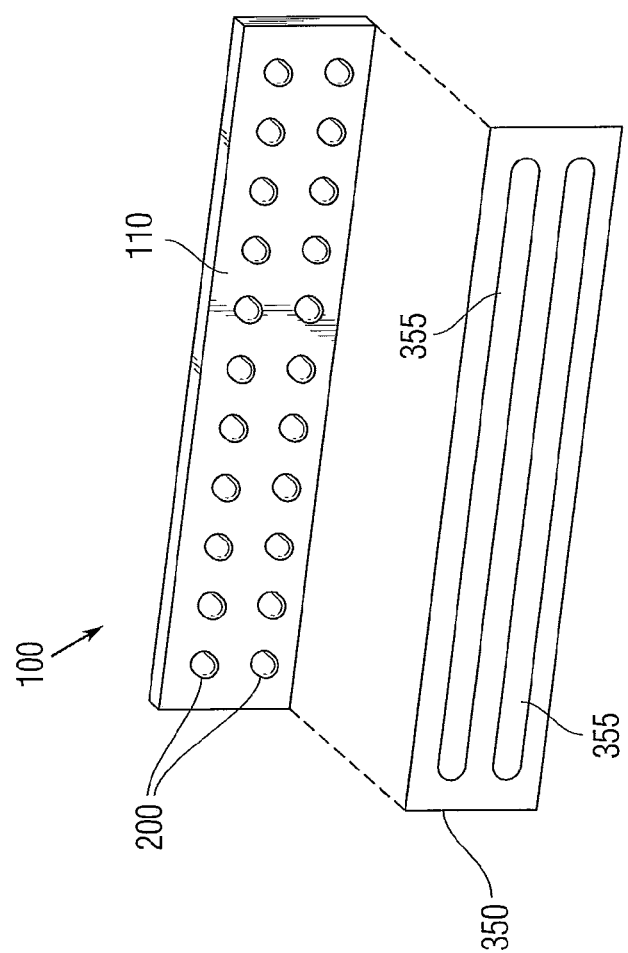
FIG. 4 is a perspective view of an interchangeable cover plate being applied to the LED emergency light safety apparatus.

In yet another embodiment shown in FIG. 4, a customizable skin or cover or face plate 350 is provided for being removably attached to one face of the substrate. For example, the face plate 350 can be a thin film or the like or a substrate that is disposed along one surface or face of the substrate 110. The plate 350 includes means for receiving the LEDs 200. For example, the plate 350 includes a pair of slots 355 that receive the rows 200 of LEDs. It can be held by electrostatic connection, a mechanical connection, such as clips, or an adhesive or any other means suitable for the intended application. The face plate 350 permits appearance of the substrate 110 to be customizable. For example, the face plate 350 can be a solid color that is designed to match or be complementary to the color of the vehicle or the face plate 350 can be configured so that it causes the LEDs 200 to stand out more.

In one embodiment, the LEDs 200 are disposed about 1 inch apart from one another; however, other spacings are equally possible.

As previously mentioned, the apparatus 100 can be placed in any number of different locations within or relative to the vehicle. In addition, when the substrate 110 is formed of a flexible material, the apparatus 100 can be folded and stored in a convenient location, such as the trunk of a vehicle. The apparatus 100 also can include integral means for converting the substrate into a structure that can be hung using magnets or directly attached to a metal body part using the magnets.

The LEDs 200 can come in more than one color and the controller 150 can be configured to select the color LED to utilize in forming the light signal. For example, the user can select that a red, yellow, white or combination thereof be used as the color of the light signal.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. An LED emergency light apparatus for use with a motorized vehicle comprising:
   a foldable substrate that is formed of a plastic material;

a plurality of light emitting diodes arranged about and coupled to the substrate such at a portion thereof protrudes beyond one face of the substrate;

a controller in electric communication with the light emitting diodes and a power source; and means for releasably attaching the substrate to a support surface, wherein the means comprises suction cups that are separate and detachable from the substrate, each suction cup including a stem that has a first magnet at a free end opposite a cup portion thereof, the first magnet for being magnetically coupled a second magnet that is associated with the substrate so as to permit the suction cup to be magnetically coupled to the substrate to permit mounting to the support surface yet also the suction cup is detachable from the substrate.

2. The apparatus of claim 1, wherein the substrate comprises a flexible film and includes a plurality of score lines that define fold lines for the substrate.

3. The apparatus of claim 1, wherein the light emitting diodes are arranged in columns and rows.

4. The apparatus of claim 1, wherein the light emitting diodes comprise multi color diodes.

5. The apparatus of claim 1, wherein the controller comprises a processor that is disposed within the flexible substrate and the power source comprises one or more batteries.

6. The apparatus of claim 1, wherein the second magnet is disposed within a pocket that is integrally formed as part of the substrate.

7. The apparatus of claim 1, further including a cover plate that mates with the substrate to change an appearance of the substrate.

8. The apparatus of claim 1, wherein the substrate comprises two sheets of a polymeric film that are joined together along peripheral edges thereof.

9. The apparatus of claim 1, wherein the plurality of light emitting diodes are arranged in such a way to represent a series of side-by-side X shaped lights.

\* \* \* \* \*